United States Patent [19]

Schofield

[11] Patent Number: 4,960,329
[45] Date of Patent: Oct. 2, 1990

[54] CHIRP PULSE ECHO RANGING APPARATUS

[75] Inventor: John M. S. Schofield, Redhill, Great Britain

[73] Assignee: U.S. Philips Corporation, New York, N.Y.

[21] Appl. No.: 232,400

[22] Filed: Aug. 15, 1988

[30] Foreign Application Priority Data

Aug. 14, 1987 [GB] United Kingdom ............... 8719269

[51] Int. Cl.$^5$ ........................... G01C 3/08; G01P 3/36
[52] U.S. Cl. ......................................... 356/5; 333/151; 333/152; 342/111; 342/132; 356/28.5; 367/101; 367/102
[58] Field of Search .................... 356/5, 28.5; 342/109, 342/111, 112, 116, 128–132; 367/101, 102; 333/151, 152

[56] References Cited

U.S. PATENT DOCUMENTS

| | | | |
|---|---|---|---|
| 3,800,247 | 3/1974 | Tancrell et al. | 333/30 R |
| 4,005,417 | 1/1977 | Collins . | |
| 4,666,295 | 5/1987 | Duvall, III et al. | 356/5 |
| 4,743,110 | 5/1988 | Arnaud et al. | 356/5 |

OTHER PUBLICATIONS

Hulme et al., "A CO$_2$ Laser Rangefinder Using Heterodyne Detection and Chirp Pulse Compression," *Optical and Quantum Electronics*, 1981, pp. 35 & 36.

Primary Examiner—Stephen C. Buczinski
Attorney, Agent, or Firm—Robert J. Kraus

[57] ABSTRACT

The difficulty of making Doppler shift velocity measurements in a chirp pulse echo ranging system is overcome by employing a pulse frequency compression filter, suitably a SAW compressor 45, having individual outputs 64, 65, 66, 67 respectively relating to adjacent contiguous frequency bands A, B, C, D, (FIG. 3) each having a bandwidth approximately equal to the chirp frequency swing. Signal detection and processing means 70 senses the occurrence of a compressed pulse on any of the outputs and measures the amplitudes of signals on all the outputs. A computer then computes the Doppler shift from the amplitude ratio of the sensed signals to adjacent frequency bands, determines the target velocity therefrom and uses the result also to correct the range measured by the counter 5.

28 Claims, 8 Drawing Sheets

|  | I | A/B | | | B/C | | C/D | |
|---|---|---|---|---|---|---|---|---|
|  | l | II $\frac{w}{\&l}$ | III $\frac{m}{\&\bar{w}}$ $\&\bar{l}$ | IV $\frac{r}{\&\bar{m}}$ $\&\bar{n}$ | V n | VI $\frac{t}{\&\bar{n}}$ $\&\bar{p}$ | VII $\frac{p}{\&\bar{q}}$ | VIII q |
| l = ΣA,B,C,D−A<h | 1 | 0 | 0 |  |  |  |  |  |
| w= SA ∗ ΣA,B,C,D<A | (1) | 1 | 0 |  |  |  |  |  |
| m=ΣA,B,C,D−ΣA,B<h | (1) | (1) | (1) | 0 |  |  |  |  |
| r = SB ∗ ΣA,B,C,D−B<h |  |  |  | 1 |  |  |  |  |
| n =(ΣA,B,C,D−ΣB,(<h)&(B>h) |  |  |  | 0 | 1 | 0 |  |  |
| t =ΣA,B,C,D−C<h |  |  |  |  |  | 1 |  |  |
| r = (ΣA,B,C,D − ΣC,D<h)&(D>h) |  |  |  |  | 1 | 0 | 1 | (1) |
| q =Σ A, B,C,D−D<h |  |  |  |  |  |  | 0 | 1 |

Fig.6.

CHIRP PULSE ECHO RANGING APPARATUS

BACKGROUND OF THE INVENTION

The invention relates to a method of chirp pulse echo ranging comprising emitting a long pulse of wave energy characterised for the duration thereof by an oscillation whose frequency is caused to vary linearly and monotonically with time, receiving an echo signal resulting from reflection of the emitted energy pulse from a reflecting object, frequency compressing the received echo signal to form a corresponding echo signal pulse whose duration is short relative to that of the long pulse, and measuring the time delay between a time reference relating to the emission of the long pulse and the occurrence of the pulse of short duration thereby to determine the distance of the reflecting object.

The invention further relates to chirp pulse echo ranging apparatus comprising transmitting means for emitting extended pulses of wave energy each pulse being characterised for the duration thereof by an oscillation whose frequency is varied linearly and monotonically, receiving means for receiving echo signals resulting from reflection of the emitted wave energy from a reflecting object, frequency compression means having a frequency dispersion characteristic such that components of a given applied received echo signal associated with different frequencies of said oscillation are applied to an output of the frequency compression means at substantially the same time to form an echo signal pulse of short duration, and timing means for determining the time delay of the occurrence of the short echo signal pulse relative to a transmitter timing reference pulse thereby to indicate the range of the reflecting object.

The principle of pulse echo ranging is to emit an intense pulse of energy, which can be acoustic (e.g. sonar) or electromagnetic in the form of optical radiation or radio waves (e.g. radar), and to measure the time interval to the subsequent arrival of a reflected echo. The distance to the source of reflection is then derived from the propagation velocity of the energy waves and the measured time for the round trip. The accuracy of the measurement of the range of a reflecting source and the ability to distinguish between echos from different reflection sources which are closely adjacent in range, will depend, inter alia, on the shortness of the received echo pulse on which the timing measurement is performed. However, the range from which a given detectable echo can be reliably received will depend on the fourth power of the emitted energy. Thus when the emitted pulse is made shorter in the interests of accuracy and range discrimination, the peak emitted power has to be increased accordingly to maintain the same effective maximum range. However, the scope for increasing the peak power in the simple pulse arrangement will be limited by factors such as cost and electrical breakdown, saturation of the propagation medium, or cavitation (sonar), and in the case of laser light the safety limit below which a directed beam would not damage a person's eyesight.

Chirp echo ranging method and apparatus of the kind hereinbefore specified, have been developed in order to meet this difficulty by increasing the effective emitted energy while maintaining the accuracy of range determination and discrimination. In the chirp arrangement the emitted energy pulse is lengthened, e.g. by 20 or more times, and is encoded, suitably by means of an oscillation having a monotonically varying frequency, typically a frequency varying linearly with time. The oscillation can comprise the oscillating energy wave forming the emitted pulse.

The frequency compression means comprises in effect a dispersive delay means, and applies a delay to the received echo signal which is greatest for the first part of the signal associated with the initial frequency of the encoded oscillation, and progressively decreases as the oscillation frequency varies monotonically with time until the shortest delay is applied to the last part of the signal associated with the final frequency of the oscillation. The difference between the delays applied to the initial and final oscillation frequency components is made equal to the duration of the emitted pulse with the result that all the oscillation frequency components of a received echo signal arrive at the output of the frequency compressor at the same time thus generating a short echo signal pulse whose time of occurrence can be accurately determined. The shortness of the generated pulse will depend on the receiver bandwidth. It should be understood that the time interval measured between the occurrence of a transmitter timing reference pulse coincident for example with the start of the emitted pulse, and the occurrence of a short echo signal pulse will include not only the time taken for the emitted energy to propagate to and to return from a source of reflection and which is therefore representative of the range thereof, but also the delays introduced by the frequency compressor and other parts of the system which latter are constant or predictable and can be readily taken into account when determining the range from the measured time interval.

Pulse echo ranging systems are frequently required to be able to sense whether a source of reflection has a velocity along the line of sight relative to the ranging apparatus and, if so, to determine the magnitude thereof. In the simple pulse echo system, the line of sight velocity can readily be determined by detecting and measuring the doppler change in the frequency of the returned echo signal. In the case of a chirp echo signal, however, the imposed frequency modulation and long emitted pulse duration introduce difficulties into the measurement of doppler shift.

A $CO_2$ laser rangefinder using heterodyne detection and chirp pulse compression is described by K. F. Hulme et al in Optical and Quantum Electronics, Vol. 13(1981) pages 34–45, which measures the velocity of a target by employing a succession of chirp pulses some of which rise in frequency and others fall in frequency and which are called up-chirp and down-chirp pulses, respectively. If the target is stationary, echos from both the up-chirp and down-chirp transmitted pulses will be output from the chirp decoder at the same time and this will give the true range. If the target is moving along the line of sight, one decoded echo will occur before the correct time while the other will occur after by the same time difference. The actual range can thus be determined from the mean value of the two times of occurrence while the velocity can be determined from the difference. This may be satisfactory in an ideal situation when there is only one object within a given range span to provide a significant echo. In practice, however, the situation will of often occur in which several proximate target objects may be present within a region of interest travelling at different line of sight velocities and it will then become difficult if not impossible to identify the correct pairs of up- and down-chirp echos relating to any- selected target.

SUMMARY OF THE INVENTION

It is an object of the invention to provide an improved chirp echo ranging method and apparatus which can overcome the aforementioned difficulty enabling a measurement of line of sight velocity to be readily performed using the effects of doppler frequency shift.

According to the invention there is provided a method of chirp pulse echo ranging comprising emitting a long pulse of wave energy characterised for the duration thereof by an oscillation whose frequency is caused to vary linearly and monotonically with time, receiving an echo signal resulting from reflection of the emitted energy pulse from a reflecting object, frequency compressing the received echo signal to form a corresponding echo signal pulse whose duration is short relative to that of the long pulse, and measuring the time delay between a time reference relating to the emission of the long pulse and the occurrence of the pulse of short duration thereby to determine the distance of the reflecting object, characterised in that the frequency compression of the received signal is related to two adjacent frequency passbands such that respective echo signal pulses of short duration are simultaneously and individually generated by received echo signal frequency components present in the respective passbands, and the line of sight velocity of the reflecting object is determined from the relative amplitudes of the simultaneously generated respective short signal pulses.

According to the invention there is further provided chirp pulse echo ranging apparatus comprising transmitting means for emitting extended pulses of wave energy each pulse being characterised for the duration thereof by an oscillation whose frequency is varied linearly and monotonically, receiving means for receiving echo signals resulting from reflection of the emitted wave energy from a reflecting object, frequency compression means having a frequency dispersion characteristic such that components of a given applied received echo signal associated with different frequencies of said oscillation are applied to an output of the frequency compression means at substantially the same time to form an echo signal pulse of short duration and timing means for determining the time delay of the occurrence of the short echo signal pulse relative to a transmitter timing reference pulse thereby to indicate the range of the reflecting object, characterised in that the frequency compression means is provided with individual outputs respectively relating to at least two adjacent frequency bands, and in that there are provided means arranged to determine the relative magnitudes of short echo signal pulses occurring simultaneously at the respective individual outputs relating to a pair of adjacent frequency bands thereby to derive the line of sight velocity of the corresponding source of reflection relative to the apparatus.

A chirp pulse echo ranging method and apparatus in accordance with the invention has the advantage that the velocity of a target can be measured using only one emitted chirp pulse so that targets adjacent in range can be individually measured with less likelihood of ambiguity than when a two-pulse system is employed. A further advantage results from the division of the output frequency band of the frequency compressor into at least two adjacent passbands in that the narrower output passband improves the signal to noise ratio and this effect will be enhanced if several individual output passbands are employed.

BRIEF DESCRIPTION OF THE DRAWINGS

Embodiments of the invention will now be described by way of example, with reference to the accompanying drawings figures, of which:

FIG. 6 is a table of logic values employed in the operation of FIG. 5.

DESCRIPTION OF THE PREFERRED EMBODIMENTS

Figure 1:
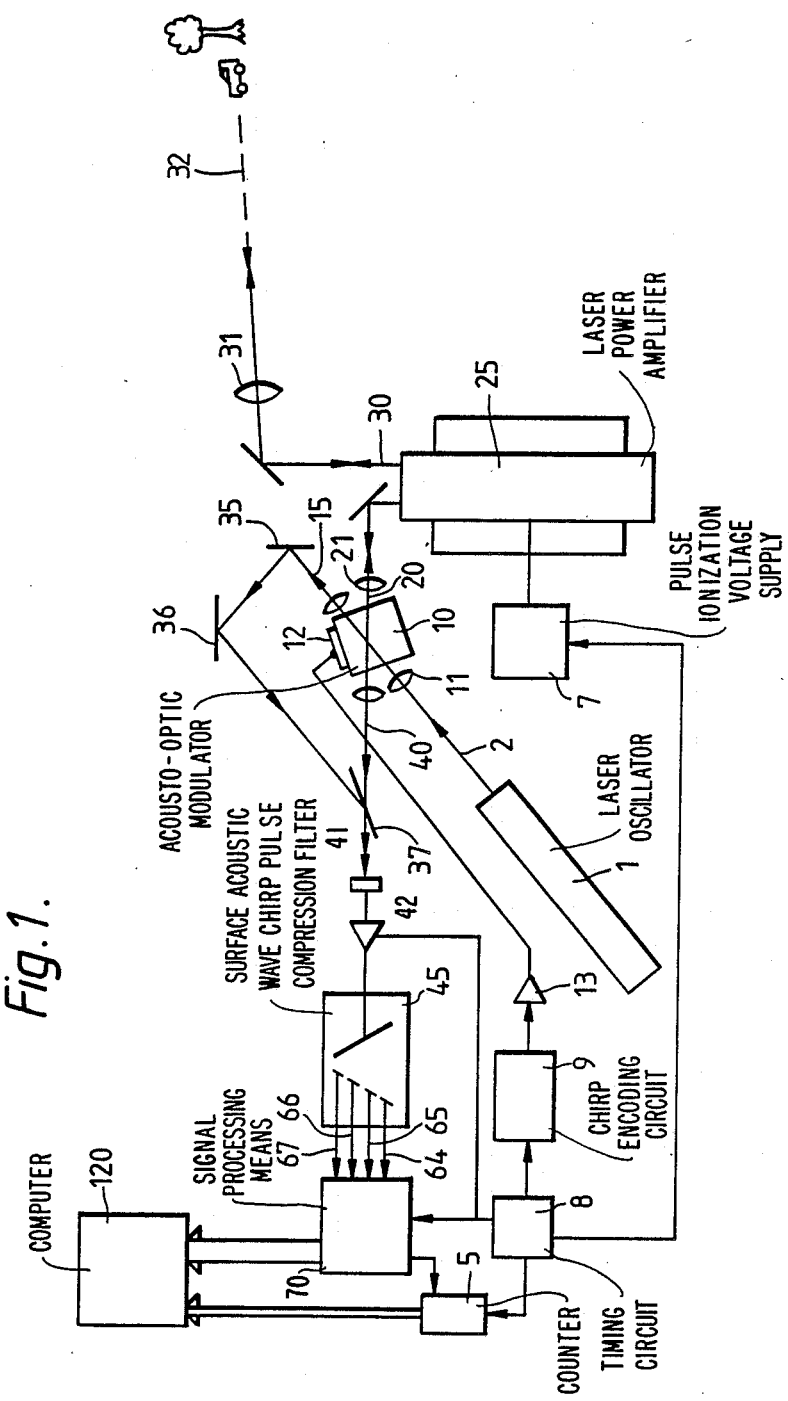
FIG. 1 schematically shows a chirp echo ranging apparatus in accordance with the invention.

FIG. 1 illustrates schematically a chirp echo ranging apparatus in accordance with the invention and comprises a CO2 laser rangefinder operating at a wavelength of 10.6 $\mu$m. It may be observed that the eye attenuates and does not focus optical radiation of this wavelength and it is therefore considered relatively safer for general use than shorter wavelengths.

A laser oscillator 1 provides a continuous source of optical radiation of stable frequency during a range determination. The laser 1 is suitably a waveguide CO2 laser in a resonant optical cavity, see for example H. Kogelnik et al., Proc. IEEE, vol. 54 (October 1966), pages 1312–1329, concerning optical cavities and P. C. Conder et al., Infrared Physics, vol. 25, No. 1/2 (1985) pages 61 to 67. The laser 1 can be optically tuned by piezoelectrically displacing an end mirror of the optical cavity in a conventional negative feedback arrangement employing, suitably, an etalon grating as frequency discriminating element in, for example, one of the arrangements described or referred to by P. W. Smith, Proc IEEE vo. 60 (April 1972), pages 422 to 440.

The parallel output beam 2 of continuous wave 10.6 $\mu$m radiation from the laser 1 is directed into an acousto-optic modulator 10 at the Bragg angle via a germanium lens 11 to converge the beam to a waist in the modulation region. The modulator 10 comprises conventionally a block of germanium with optically polished input and output side faces through which the laser beam is passed, and an end face on which a piezoelectric transducer 12, formed for example from lithium niobate, is mounted so as to direct a beam of ultrasound through the region traversed by the laser beam forming a grating structure of alternately increased and decreased refractive index resulting from the respective compression and rarifaction brought about by the sound waves. The transducer is energised via an amplifier 13 from a conventional chirp encoding circuit 9 which, under the control of a timing circuit 8, generates, after the occurrence of a transmitter timing pulse, a pulse of oscillation of monotonically varying frequency, suitably a frequency which varies linearly with time. For example, in the said paper by Hulme et al. the up-chirp modulation varied linearly from 53 MHz to 67 MHz in a duration of 4 μs, the chirp thus being centred at 60 MHz.

The modulated output radiation beam 20 emerges from the acousto-optical modulator 10 in a direction inclined by twice the Bragg angle from that of the input beam 2, and is refocussed by a further germanium lens 21 into a parallel beam which is shaped by mirrors into a beam of strip cross-section and passed to a laser power amplifier 25. The amplifier 25 is suitably a multipass transversely energised atmospheric (TEA) CO2 laser in which the laser beam to be amplified is reflected back and forth along the laser via non-overlapping paths in an unstable mirror cavity arrangement formed by one concave and one convex mirror whose surfaces are further suitably formed so that a strip-like input beam can enter on one side of the cavity and follow a zig-zag path to and fro until it emerges on the other side of the cavity as an output beam 30 amplified for example by 106 times. To achieve this the modulator timing circuit 8 also generates a preionisation timing pulse which is passed to a pulsed ionisation voltage supply 7 connected to the ionising electrodes (not shown) of the TEA laser 25 so that the gas in the optical path is ionised just before the start of the chirp modulation pulse from the modulator 10, and so that the state of ionisation will persist for the duration of the chirp pulse.

The output beam 30 is then directed to illuminate a target via an output objective lens 31. The illuminating beam 32 can be scanned mechanically by moving the whole assembly or by means of deflection mirrors.

The return echo from a target is received via a receiver lens. This lens is preferably the same as the output objective lens 31, and the received reflected light energy can follow the same path as the emitted beam as far as the A-0 modulator. In the present case the received energy is passed back through the laser amplifier 25 whose amplification will have fallen to an insignificant value, through the lens 21 and into the acousto-optic modulator 10 which will then be inoperative. Since there will then be no refractive grating effect present, the beam of received energy will pass unhindered straight through the modulator block 10 following the path 40 to a detector 41 which must have a good high frequency performance, suitably a mercury cadmium telluride (CMT) or a lead tin telluride photodiode. The detector 41 is arranged to function as a heterodyne detector by simultaneous irradiation by a local oscillation beam of optical radiation derived from the continuous-wave waveguide laser 1 as follows.

In the interval between transmitted pulses, no acoustic wave is generated by the transducer 12 and in the absence of any resultant refractive structure in the modulator 10 the laser beam 2 from the waveguide laser 1 will pass straight through the acousto-optic modulator 10 to form the local oscillator beam 15 which is directed via a mirror 35, a mirror 36 and a further partially reflecting mirror 37 in the path of the received echo beam 40, onto the surface of the detector 41 in order to provide a difference frequency signal in the detector output.

The heterodyne signal output from the detector 41 which comprises the modulation frequency applied to the modulator 10 during the formation of the transmitted chirp pulse and subsequently modified by the Doppler effect due to line-of-sight motion of the reflecting target relative to the apparatus, is amplified by a conventional swept gain amplifier 42 and then fed to frequency compression means in the form of a surface acoustic wave chirp pulse compression filter 45.

Figure 4:
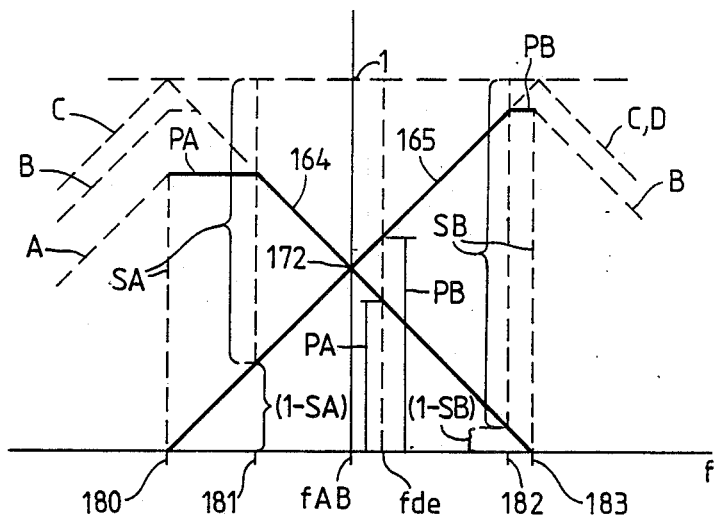
FIG. 4 is a diagram illustrating the crossover regions of FIG. 3.

The pulse compression filter 45 conveniently comprises a surface acoustic wave device formed on lithium niobate, and is based on a conventional form of pulse compression filter using inclined geometry as illustrated for example by FIG. 4.22 on page 133 of Acoustic surface waves, edited by A. A. Oliner and published by Springer-Verlag 1978.

Figure 2:
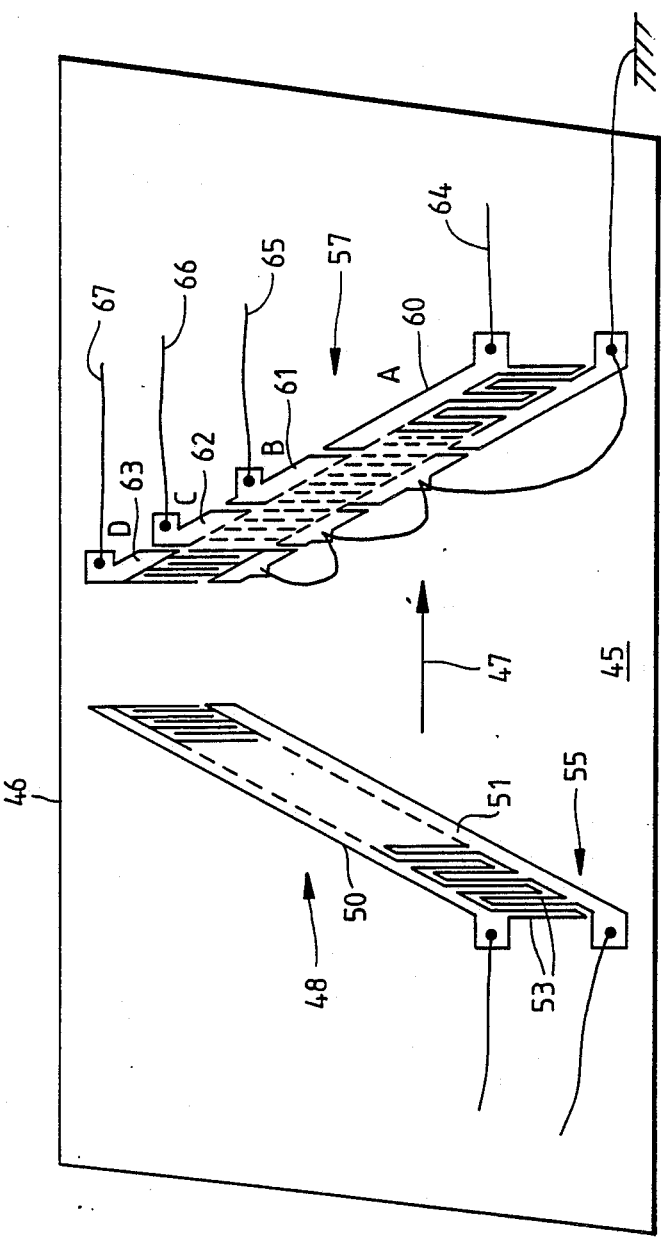
FIG. 2 illustrates a SAW pulse compression filter in accordance with the invention.

The accompanying FIG. 2 diagrammatically illustrates a form of the pulse compression filter 45 employed in accordance with the invention. Inclined and frequency-tapered launching and receiving interdigital electrode arrays are formed on the surface of a substrate wafer 46 of lithium niobate and arranged so that surface acoustic wave propagation takes place parallel to the propagation direction 47. The input, i.e. launching, transducer 48 comprises two parallel bus bars 50, 51 inclined at a given angle to the propagation direction 47, and connected to alternate interdigital electrodes 53 which are disposed at right angles to the direction 47. In the present example the transmitted chirp modulation commences with the lowest modulation frequency and rises linearly with time to the highest. Thus the electrodes 53 at the end 55 are spaced so as to transduce the lowest frequency of the required passband and the electrode spacing is linearly reduced until at the other end of the transducer 48 the smallest electrode spacing is provided such as to transduce the highest frequency of the overall band of frequencies to be compressed. This frequency band will of course be wider than the band of frequencies characterising the transmitted chirp because allowance must be made for the maximum increase and decrease in the boundary frequncies of the received chirp echo due to Doppler shift for both approaching and receding targets over the velocity range of interest.

The output, i.e. receiving, transducer means 57 also comprises parallel bus bars inclined oppositely at a similar angle to the propagation direction 47, and connected to alternate interdigital electrodes disposed transversely to the direction 47. The electrode spacing on the receiving transducer means corresponds to the spacing along the propagation direction of the immediately opposite electrodes on the launching transducer. Thus, in the present example the lowest frequency signal will travel the furthest distance as a surface acoustic wave over the substrate 46 and will be delayed longest. The mutual inclination of the input and output arrays is arranged so that for a frequency scan which starts at the lowest frequency and increases in a corresponding manner to that of the transmitted chirp modulation pulse, up to the highest frequency required, all the surface acoustic wave frequency components will arrive at the output transducer means at the same time.

In accordance with the invention the receiving transducer means 57 is divided into at least two independent sections. In the present example, four independent transducer sections 60, 61, 62 and 63, are provided with individual output connections 64, 65, 66, 67. Each section 60, 61, 62, 63, covers a corresponding part A, B, C, D, of the overall bandwidth of interest, and has an individual bandwidth approximately equal to the band width of the transmitted chirp modulation. The frequency boundary between the passbands B and C of the centre sections 61 and 62 is made to correspond to the centre frequency of the chirp modulation applied to the transmitted pulse. The individual outputs 64, 65, 66 and 67, which relate to respective adjacent frequency bands A, B, C, and D, are connected to signal processing means 70, which is arranged to determine the relative magnitudes of the decoded short echo signal pulses occurring simultaneously at respective individual outputs of adjacent individual sections of the output transducer.

Figure 3:
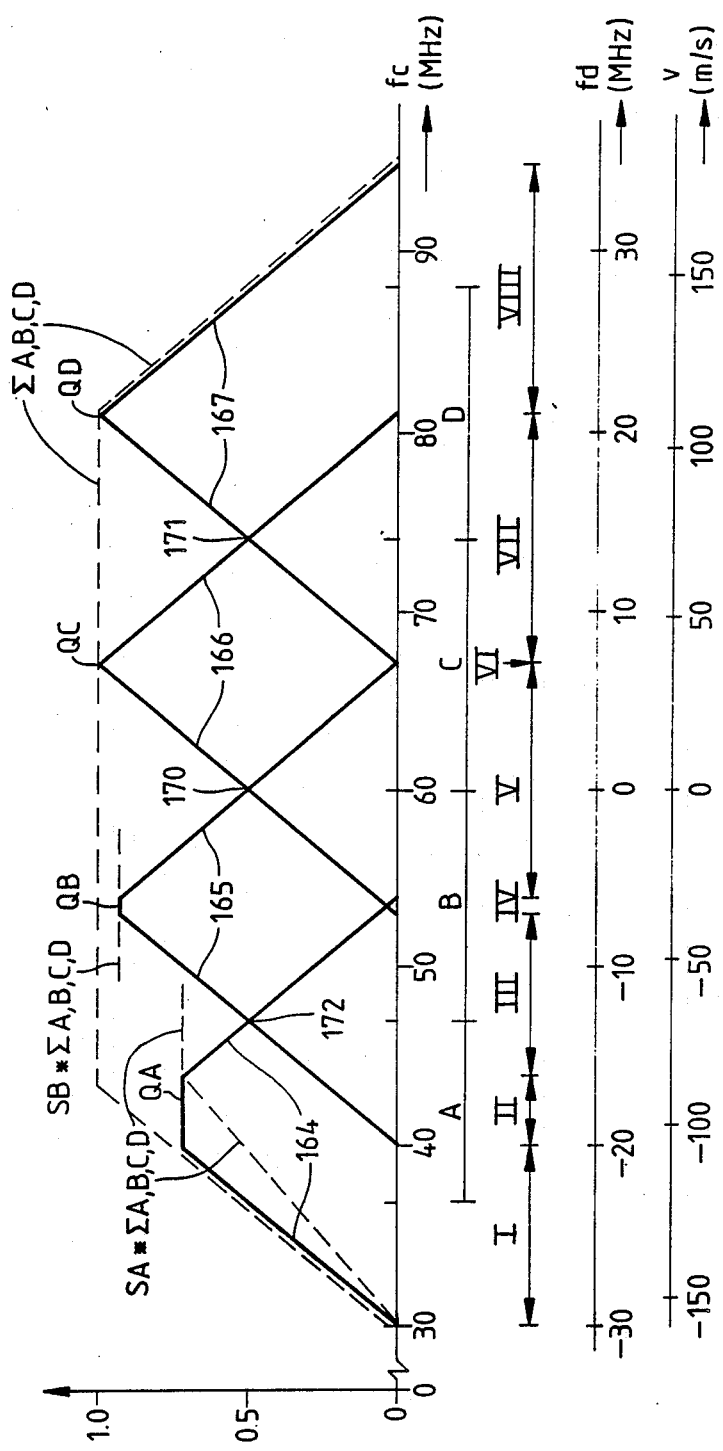
FIG. 3 is a normalised compressed pulse amplitude-frequency diagram illustrating the operation of the apparatus of FIGS. 1 and 2.

FIGS. 3 and 4 are graphs illustrating the relative decoded pulse amplitudes plotted against the centre frequency fc of the received echo pulse. The amplitudes are normalised to unity which represents the output pulse amplitude for a chirp signal whose frequency modulation swing lies entirely within the frequency band of the corresponding individual output section of the transducer. The frequency axis in FIG. 3 indicates the centre frequency fc of the chirp echo modulation signal 100 and depicted below the axis are corresponding scales representing the corresponding Doppler frequency shift fd and associated line-of-sight velocities in meters per second relating to the example of a chirp modulation extending from an initial frequency f1=53 MHz to a terminal frequency f2=67 MHz about a centre frequency fc=60 MHz. This represents a frequency modulation depth of 24 percent.

It can be shown that the optimum modulation depth which a lithium niobate SAW transducer can handle without an excessive insertion loss is 25.7 percent for a suitable 128 degree Y cut substrate with the surface wave propogating along the X axis, and this depends on the piezoelectric coupling constant k. Thus, in formulating the output transducer sections 60, 61, 62 and 63, the modulation depth has been restricted to 25 percent or below. This is easy for the sections 62 and 63 forming the passbands C and D at the high frequency end of the overall passband to be covered. However, in the present example, this restriction makes it necessary to reduce the passbands A and B of the lower frequency sections 60 and 61 to below the frequency modulation swing of the chirp pulse which will mean that the maximum normalised pulse amplitude from such an output transducer section will be a fraction less than unity whose value is equal to the maximum proportion of the frequency swing that can be transduced. This is the reason for the reduced and flat topped peaks shown for the passbands A and B in FIG. 3. The flat-topped regions represent regions of amplitude saturation with respect to a change in Doppler frequency. This is indicated in the generalised cross-over diagram of FIG. 4 in which the saturation magnitudes SA and SB represent the maximum normalised outputs at 64 and 65 of the output sections 60 and 61 relating to the passbands A and B.

The appended exemplary table of values lists the frequency and line-of-sight velocity data relating to the passbands A, B, C and D, of the output transducer assembly 57, based on the aforementioned chirp modulation quoted by Hulme et al and resulting in the output responses 164, 165, 166, 167 shown in FIG. 3 from the outputs 64, 65, 66 and 67 indicated in FIGS. 1 and 2.

In the present example using a chirp frequency swing of 14 MHz, the optimal bandwidth of each of the output sections 60, 61, 62, 63, would be 14 MHz, but for the reasons given above this is employed only for sections 62 and 63 which transduce passbands C and D, where the relative bandwidth is about 20 percent and 17 percent respectively. This provides a well defined peak QC, QD, to the corresponding triangular response curves 166, 167. In the case of passbands A and B, however, because of the transducing requirement, the passbands for B and A have been reduced to 13 MHz and 10 MHz respectively in order to provide relative passbands of about 24 percent, i.e. just below the optimal limit for lithium niobate. This results in the flat topped saturation peaks QB and QA which slightly complicate the resultant velocity measurement as will be explained hereinafter. It is preferable that adjacent passbands A, B, C and D should be contiguous otherwise frequency gaps will render velocity measurement more difficult and incomplete. It will be seen that the conditions of contiguity and saturation mean that the lower end of an adjacent response becomes zero at the more distant end of a flat topped peak, i.e. the response 165 of passband B falls to zero at the left hand end of QA in FIG. 3.

In the balanced arrangement shown in FIG. 3, the central cross-over point 170 for which the output pulses on the adjacent leads 65 and 66 representing the decoded pulses from frequency channels B and C, are equal in amplitude, is located at the central frequency fc (=60 MHz) of the transmitted chirp modulation and therefore represents zero Doppler shift. It will be seen that the other crossover points 171 and 172 between C and D and between A and B represent positive and negative Doppler shifts of 14 MHz and −13 MHz, respectively.

Velocity measurement will now be considered with reference to FIG. 4 the continuous line graph of which illustrates the respective variations of the decoded output pulse magnitudes PA, PB, relating to the overlapping responses of the passbands A and B both of which involve saturation so that a general relationship can be derived.

The Doppler shift fde of an echo signal is determined from the relative magnitudes of simultaneously occurring pulses from the relevant adjacent overlapping passbands, in the present case A and B. The Doppler shift fde then determines the line-of-sight velocity v in m/s from the wavelength lambda (10.6 μm) of the laser radiation via equation 1:

v=lambda * fde/2.

The relative magnitudes of the pulses can be conveniently expressed as the ratio of the pulse magnitudes, e.g. PA/PB or PB/PA.

The crossover point 172 of the two responses 164 and 165 for which PA/PB=1 represents the situation in which the centre frequency fc of the chirp echo signal is located at the boundary frequency fAB between the two adjacent passbands A and B. This is correspondingly the case at the other crossover points 170 and 171 shown in FIG. 3. In the case of the point 172 the Doppler frequency fAB is equal to the band width of the passband B, namely 13 MHz which corresponds, using equation (1), to about −69 m/S, the negative sign representing a receding target. Similarly in the case of the point 171, the Doppler frequency fCD equals the passband width of C, namely 14 MHz corresponding to an approach velocity of about 74 m/s. At the central crossover point 170, of course, the Doppler frequency fBC will be zero.

In general the Doppler frequency shift fde of the centre frequency of a received chirp echo will differ from any of these spot frequency and in considering the case of decoded pulses generated in the range covered by the solid line responses in the overlaps of passbands A and B in FIG. 4, three regions can be identified over which changes in the pulse ratio PB/PA and its inverse PA/PB will be differently related to the change in the Doppler frequency difference from the crossover value fAB. These regions comprise in the case of the AB overlap shown in FIG. 4, of a central region between the frequency markers 181, 182, in which both response slopes 164 and 165 are linear, and the two saturation regions 180 to 181 and 182 to 183 in which the responses of A and of B, respectively, become saturated.

Let the difference between the Doppler frequency shift fde and a spot frequency, in the present case fAB, be represented by deltafd. In the central region (181 to 182) which is bounded on the left in FIG. 4 by the onset of saturation, i.e. where PA equals the saturation value SA and PB=(1-SA), and on the right where PB equals the saturation value SB and PA=(1-SB), the value of deltafd can be derived from the following equation 2:

$deltafd = (f2-f1)(PB-PA)/(2(PB+PA))$.

Since it may be simpler in some cases from the hardware point of view to derive from each simultaneously detected signal pair a ratio and an inverse ratio, i.e. to derive PA/PB and PB/PA directly, the relationship of equation 2 may be re-written as equation 3:

$deltafd = (f2-f1)(1-(PA/PB))/(2(1+(PA/PB)))$.

The presence of a pair of simultaneous echos in the central range of the AB overlaps can be identified by testing the logic expression 4:

(1-SA)/SA less than or equal to PB/PA less than or equal to SB/(1-SB).

The presence of a pair of simultaneous echos in the left hand saturation range 180 to 181 of the AB overlaps can be identified by testing the logic expression 5:

0 less than PB/PA less than (1-SA)/SA

When this condition is fulfilled the value of deltafd can be derived from equation 6:

$deltafd = (f2-f1)((SA*PB/PA)-0.5)$.

This expression is derived from the following considerations. At the left hand end of the range, deltafd is equal to half the frequency swing (f2-f1) of the chirp pulse and the amplitude of PB is zero. As the point 181 is approached, the reduction in deltafd is directly proportional to the normalised value of PB. Since the magnitude PA is saturated throughout this range as mentioned above, this ratio must be multiplied by the saturation ratio SA when processing the data in order to normalise the saturation amplitude of the divisor, PA, to unity.

In a similar manner, a pair of decoded echo pulses PA, PB occurring simultaneously in the adjacent output sections relating to passbands A and B, and located in the right hand saturation range 182 to 183 of the AB overlap can be identified by testing the logic expression 7:

0 less than PA/PB less than SB/(1-SB).

When this statement is true the value of deltafd can be derived from equation 8:

$deltafd = (f2-f1)(0.5 - (SB*PA/PB))$.

This is derived in a similar manner to equation 6. When the appropriate value of deltafd has been determined, the Doppler shift fde=fAB+deltafd, is calculated and the target velocity determined from equation 1.

The same procedure using similar relationships is employed when a pair of pulses occur simultaneously in the crossover regions BC and CD, indicated by dashed line extensions in FIG. 4. The region BC contains only one saturation region which in fact coincides with and therefore duplicates the right hand region 182 to 183 of the region AB. Thus only an adaptation of equation 2 relating to the central, linear crossover region is required. In the case of the region CD, no saturation occurs and an adaptation of equation 2 is all that is required. However, in a region without saturation both the pulse ratios for example PC/PD and PD/PC can have arbitrary values extending from zero at one end of the range to infinity at the other. The possibility of very large or infinite values can complicate the provision of a suitable analog to digital converter and can slow down the processing of data. It may therefore be found desirable as a standard procedure to employ only ratios of unity or less, i.e. in the case of FIG. 4 using PA/PB for calculations in the central region at and to the right of the central point 172 using the test: PA less than or equal to PB, and employing equation 3. For pulses occurring to the left of 172 for which PB is less than PA, equation 2 can be re-written as equation 9:

$deltafd = (f2-f1)((PB/PA)-1)/(2((PB/PA)+1))$.

In order to carry out the logic tests 1 to 7 and compute the line-of-sight velocity of a target using, as appropriate, equations 1 to 9, the received echo signal components on the four individual outputs 64, 65, 66, 67 of the SAW filter 45 are preferably amplified and are then rectified by corresponding detectors to provide unidirectional signals whose amplitudes can be sampled and, suitably, converted into a digital form which can be stored and operated on by a suitably programmed computer 120. The sampling process is preferably associated with corresponding individual peak detectors arranged to detect the occurrence of a signal peak greater than a minimum threshold. When a peak has been detected in any one of the channels, the signals in all the channels would be sampled and stored by the computer as an event together with the associated count of a range timing counter to await some free computing time to carry out the various logic checks and computation required. In a pulse echo ranging system, considerable time exists between the end of an echo reception period and the emission of the next pulse which can be used to sort out data collected during a range scan and to perform such computations. If only a few echos are received, further time can be found for computation even during the range scan.

As an alternative to using the computer 120 to perform the logic tests for determining to which region of the overlap diagram of FIG. 3 an arbitrary received echo belongs, these tests can be performed using analog methods and hardware including gates and comparators and one example of an arrangement for this purpose will now be described with reference to FIGS. 5, 6 and 7.

Figure 5:
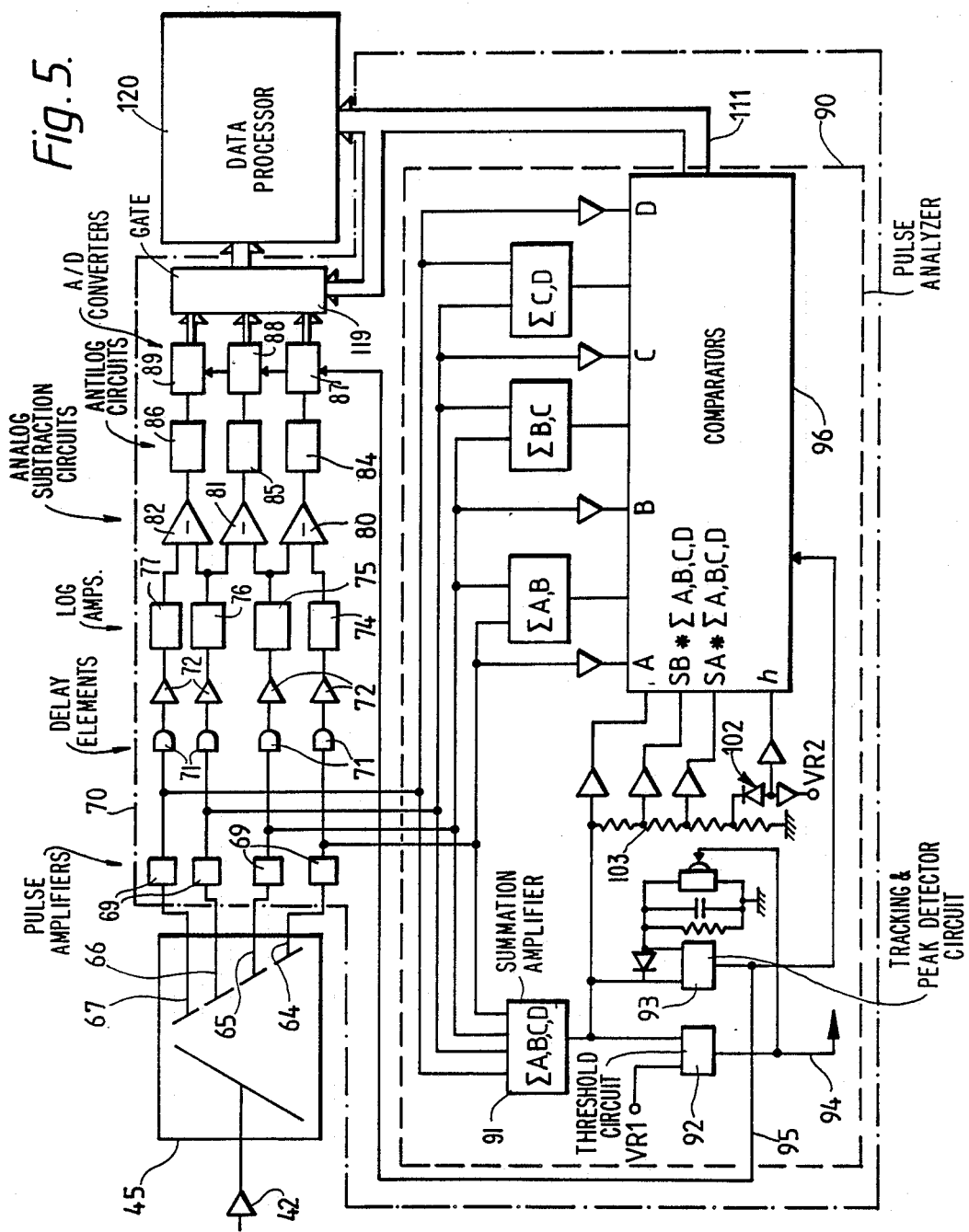
FIG. 5 is a schematic diagram illustrating a compressed echo signal processing circuit.

FIG. 5 illustrates one example of the signal processing means 70 in which signal rectifiers and pulse amplifiers 69 are respectively connected to the four individual outputs 64, 65, 66, 67, of the SAW pulse compression filter 45. The presence of a received echo signal is identified by means of a pulse detection and analysis arrangement 90 which in the present example includes a summation amplifier 91 arranged to form a sum signal SUM(A,B,C,D) representing the momentary sum of the four signals at the outputs 64, 65, 66, 67 of the filter 45. This signal is first used to detect the presence of a received signal above a minimum threshold value by means of a conventional threshold circuit 92 which provides an enabling signal output 94 and this can be used to reset subsequent stages if desired.

The sum signal is also applied to a tracking and peak detector circuit 93 which follows an increase in amplitude to a peak and generates an output signal as soon as the amplitude decreases. This detects the presence of an echo pulse and provides a timing signal 95 for subsequent operations on the received signal such as sampling, initiating analog to digital conversion and data transfer.

The pulse analyser 90 is also arranged to identify the range in the Doppler shift diagram of FIG. 3 in which the received echo is situated in order to provide control information for correctly processing the signal components so as to calculate the target velocity. This identification is performed by an assembly 96 of comparators and a suitable network of logic gates which provide a digital coded control signal for determining subsequent operations on the received echo, an example of which is shown in FIG. 7.

In the present example, eight Doppler ranges indicated by roman numerals on the diagram of FIG. 3, can be identified by the analyser 96 as will now be described with reference to FIGS. 5, 6 and 7. FIG. 6 is a table indicating a suitable set of logic tests that can be performed on the simultaneously occurring echo signal components A, B, C, D, and how the results of those tests can combined to provide the control signal identifying the associated Doppler range. Although for descriptive purposes, a roman numeral is employed, an output digital coded signal is provided which can, in the present example, take the form of a four bit hex number, only three bits being required to define the eight ranges.

The first range I relates to a target receding at a speed outside the measurement range, i.e. faster than 106 m/s in the present example, and the control signal has to cause the data processor to display a corresponding message to that effect. The range is identified by the sum of signals A, B, C and D, SUM (A, B, C, D), being equal to the signal A to within a small threshold value h, indicated in Table 2 by l=1. The magnitude of h has a predetermined minimum value to allow for the effects of noise when the echo signal is weak, but for stronger signals, can be maintained at about 2 percent of the sum signal SUM (A,B,C,D). The value h is generated by the circuit 102 at the ground end of a potentiometer 103 connected to the output of the summation circuit 91. In the circuit 96 the logic test can be carried out, for example by subtracting A from SUM (A,B,C,D) in an analog subtraction circuit 104 and applying the output to one input of a comparator 105 and h to the other. The comparator output provides the logic status (1 or 0) of the test 1 which is then fed to an encoding network of logic gates 110, so that when TRUE (1), the code for the range I is selected and can be output on the control code line 111.

The second range II relates to velocity determination in the saturation region of the signal A, to which the previously mentioned logic expression 5 and equation 6 apply. This can be identified in the present example, using similar signal-derived quantities and comparator means, by further forming the logic test function w in which the total sum SUM (A,B,C,D) is mutiplied by the saturation factor SA and compared with the amplitude of the signal A. A TRUE (1) output being generated while the former is less than the latter. Multiplication by the factor SA can readily be carried out by taking the feed to a further comparator 106 from a suitable tapping on the potentiometer 103 fed by the sum signal SUM-(A,B,C,D). In this case an output TRUE (1) will also be generated in the range I. The identification of the range II must therefore include in the logic network an AND gate combination of the output w with the negated output of the test 1 in order to generate the output control code for the range II from the network 110 as indicated in the corresponding vertical column in FIG. 6.

The third range III representing the linear crossover range 181 to 182 in FIG. 4, requires the use of a further test m indicated in FIG. 6. However this test provides a TRUE output throughout ranges I, II and III, and must therefore be combined in the network 110 via an AND gate with the negations of both test 1 and test w. The TRUE (1) outputs of test m in ranges I and II and of test w in range I are given in brackets in FIG. 6 to indicate that these states are present but that they are not employed by the network 110 to determine the output. Similarly, other outputs (mainly FALSE (0)) although present, are not indicated because they are also not used.

The range IV comprises the saturation region of the signal B and again, multiplication of the signal SUM-(A,B,C,D) by the saturation ratio SB when carrying out the associated logic test r, is accomplished by a further tap on the potentiometer 103. In FIG. 3 the value of SUM(A,B,C,D) and of its product with SA and with SB are indicated by dashed lines. To avoid ambiguity at the transition points at each end of the range, the output r from the corresponding comparator 108 is combined in an AND circuit with the negation of the outputs m and n defining the adjacent ranges II and V.

Figure 7:
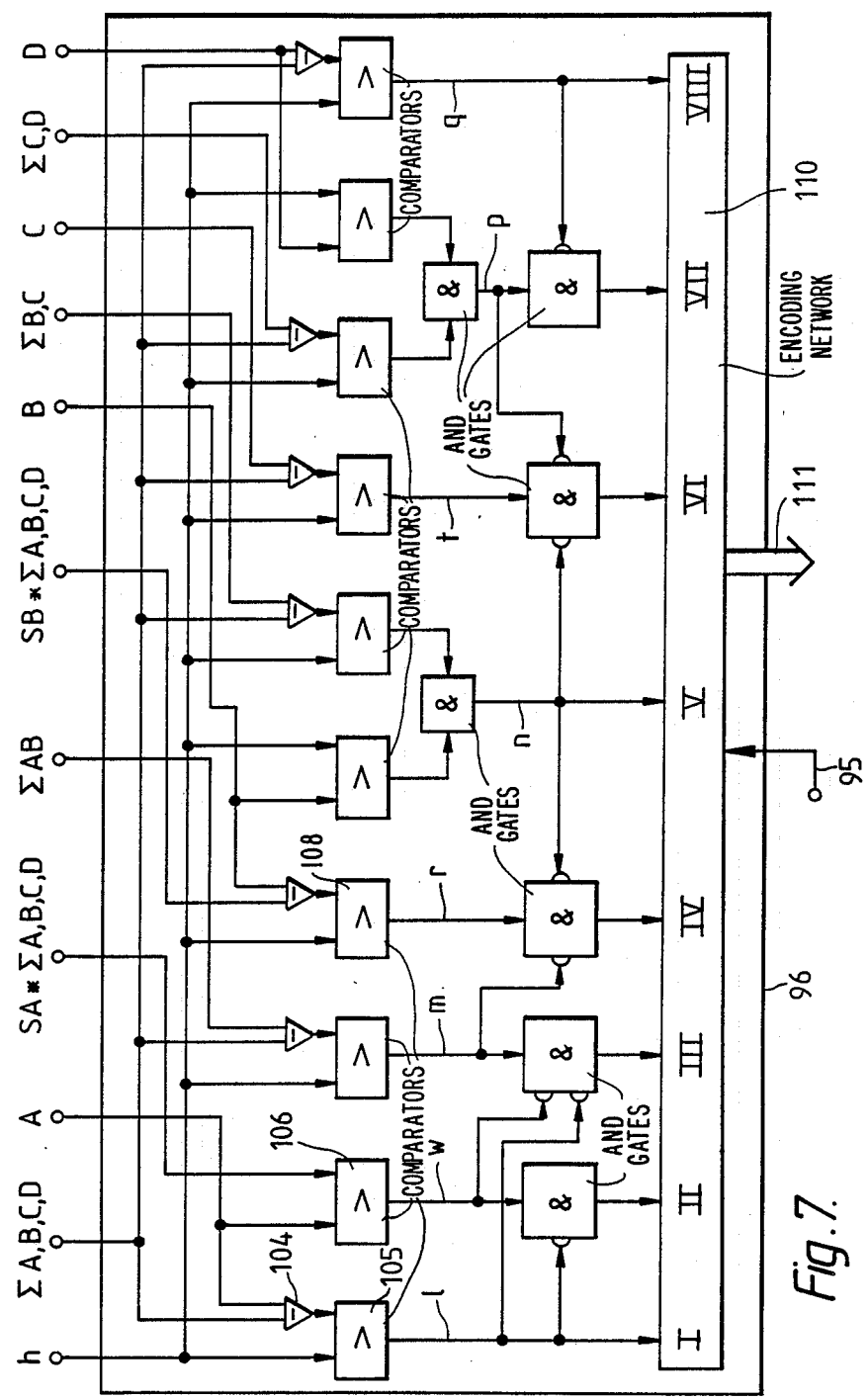
FIG. 7 illustrates a logic network relating to FIG. 6.

Derivation of the control signals for the remaining ranges follow the same principles and will be clearly evident to a normally skilled person from the remainder of the table in FIG. 6 and from FIGS. 5 and 7. In fact the "range" VI relates to a spot Doppler shift of 7 MHz between the ranges B/C and C/D. The range VIII is similar to the range I in that the control signal then instructs the processor to display an indication that the speed is out of range and that the target is approaching at a speed greater than 111 m/s.

The main signal paths from the individual outputs 64, 65, 66, 67, of the compression filter 45 can include delay elements 71 after the points of connection to pulse detector 90 to compensate for delays therein, so that the peaks of the respective echo signal components arrive at subsequent stages at the same time as the corresponding control signal.

Each output 64, 65, 55, 67, is connected to a corresponding logarithmic amplifier 74, 75, 76, 77, preferably via an associated preamplifier 72 whose gain can be adjustably preset to ensure amplitude tracking between the different logarithmic amplifiers. The respective outputs of pairs of log amplifiers 74, 75, and 75, 76 and 76, 77, which relate to adjacent passbands A,B, and B,C, and C,D, are connected to the inputs of corresponding analog subtraction circuits 80, 81 and 82 which each provide an output difference signal representing the logarithm of the ratio of the amplitudes of pulses simultaneously occurring in the associated adjacent passbands, for example the output from the subtraction circuit 80 represents log A/B. The logarithmic amplifiers and the subtraction circuits are designed to operate within clearly defined ranges of signal amplitudes whose end points can be set by suitable limting devices such as catch diodes or other signal bypass diodes. The range of echo signal amplitudes over which the circuits are required to operate, can be kept relatively manageable by means of the swept gain control amplifier 42 which is arranged to compensate as far as possible for the reduction in echo signal strength with increasing target range. Further control of the amplifier 42 can be included to adjust for changes in atmospheric attenuation.

In the present embodiment, the log ratio output signals from the respective subtraction circuits 80, 81, 82, are applied to corresponding antilog circuits 84, 85, 86, and the resultant analog signal representing the ratio of the signal strengths in the associated adjacent channels, is applied to a corresponding analog-to-digital converter 87, 88, 89. The A-D converters are arranged to operate on the value of the ratio occurring during the peak of a received echo by applying the timing signal 95 generated by the comparator 93 of the pulse analyser circuit 90, to initiate the conversion process either by actuating a sample and hold initial phase of a conventional A-D converter or, preferably, by actuating a so called flash type of A-D converter in which the analog signal is simultaneously applied to a bank of comparators having an appropriate, e.g. linear, sequence of threshold increments, the comparator with the highest threshold to change state defining the output digital magnitude.

The three outputs from the respective A-D converters 87, 88, 89, are applied via gating means 119 which is controlled by the control code signal 111 so as to select, where required, the appropriate output ratio and transfer this quantity to an input buffer store of a data processing means 120 together with the control code. Thus in response to the codes for II, III or IV the ratio A/B is transferred, in the case of V the ratio B/C is transferred and the VII the ratio C/D. The codes for the ranges I, VI and VIII are stored alone and do not gate the transfer of a ratio but provide special instructions to the processor 120, in the case of I and VIII to indicate that the velocity is out of range as mentioned above, and in the case of VI to provide the spot value of an approach speed of 37 m/s.

Target range is derived in a conventional manner for a digital pulse echo ranging system, by starting a range counter 5 from zero in synchronism with the transmitter pulse, and storing the value of the count present in the counter at the instant that an echo is received. The detected peak timing signal 95 is employed to sample the count from the counter 5, and the sampled count is then stored in association with the remainder of the data relating to the detected echo, i.e. the ratio A/B, B/C, C/D when present, and the control code which otherwise indicates the spot value or out of range indication, at an identified location in the buffer store to await further processing. Because different echos can be received in a random manner and may be close together in time, data from each echo can first be stored temporarily in a transfer buffer and quickly transferred to an identified location in a processing store to await its turn in a processing sequence directed to computing the target velocity in the case of targets relating to the ranges II, III, IV, V and VII, or of simply applying the predetermined information for the other ranges. The target velocity is computed in conventional manner using the appropriate equations given hereinbefore under the direction of the control code and using the associated logic tests where necessary.

The analog embodiment of FIGS. 5, 6 and 7 can be employed when the digital computing capacity of the system is relatively small. The logic circuitry can readily be formed as one or more integrated circuits on silicon for example.

When the velocity of a target has been calculated a timing correction tc must be subtracted from the target range timing count derived from the sampled count from the range counter 5. Part of this correction, namely to, is a fixed apparatus dependent delay independent of the target but easily found by calibration using stationary targets of known range. The other component, however, varies with the target velocity. This is because a Doppler shift will slide the region occupied by the chirp echo signal across the SAW compression filter 45, i.e. transversely to the propagation direction 47 in FIG. 2, and therefore change the amount of delay, i.e. in the present case of an up-chirp, a positive Doppler shift due to an approaching target will move the region occupied by the signal up the transducer as depicted in FIG. 2 thus decreasing the signal delay. The change in delay is proportional to the ratio of the Doppler shift fd to the chirp bandwidth f2-f1 and also to the chirp duration d. Thus the correction required is given by equation 10:

$tc = to - d*fd/(f2-f1)$.

This correction is therefore computed and applied to the stored range count.

The range and velocity data relating to that target is then complete and can be stored, displayed and further processed as required.

Although the preceding description has assumed that the chirp modulation comprises an up-chirp, a down-chirp modulation may equally well be employed and the velocity calculation will be unaffected. The velocity dependent range correction will however have to be of the opposite sign and this is implied by equation 10 because f2 will then be less than f1 causing the second term to have a negative sign before subtraction from to.

Figure 8:
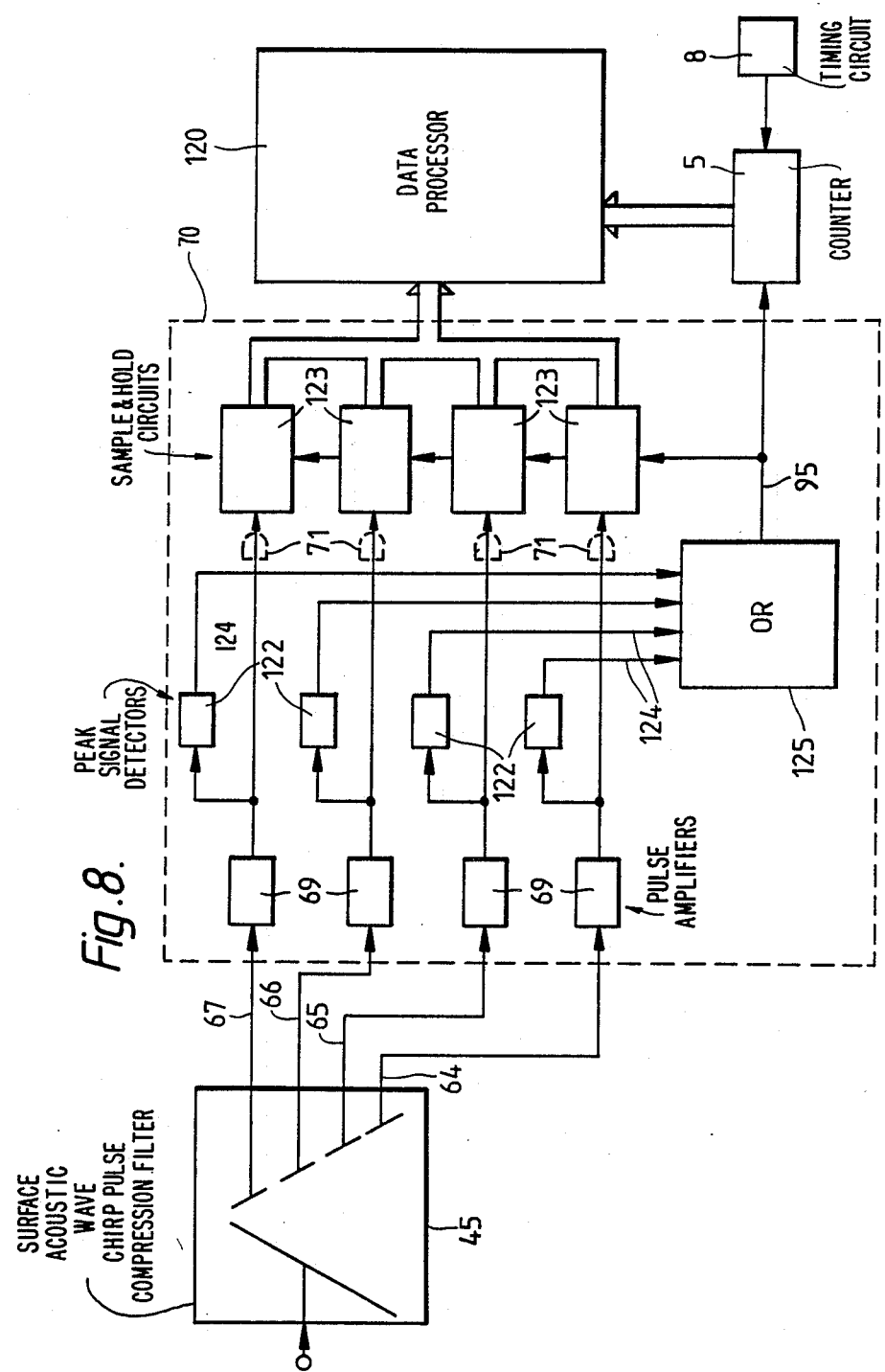
FIG. 8 is a schematic diagram illustrating a preferred alternative form of processing circuit.

A preferred form of the signal processing means 70 will now be described with reference to FIG. 8 in which each of the four individual outputs 64, 65, 66, 67, of the SAW pulse compression filter 45, is connected via a respective amplifier and detector circuit 69, to corresponding individual peak-of-signal detector circuits 122 and sample-and-hold circuits 123. The detected-peak outputs 124 from the respective peak detectors 122 are all fed to an OR circuit 125 arranged so that the detected peak output generated by a signal which is greater than a predetermined threshold set above the expected noise level, from any one of the peak detectors, will generate a "peak detected" timing signal 95 at the output of the OR circuit 125. The timing signal 95 is fed to all the sample-and-hold circuits 123 to cause them to hold in digital form the latest set of samples corresponding to or present at the occurrence of the detected signal peak. The signal 95 is also fed to the data processing means 120 to instruct it to fetch the four samples held in the hold circuits 123 and to store them together with a corresponding count value obtained from the range timing counter 5, at an appropriate temporary storage location until the processor 120 is free to process the stored values.

The processor 120 is programmed to systematically deal with the sets of stored target information during any available free time. For example the occurrence of a timing signal 95 can produce an interrupt to effect the transfer from the hold circuit 123 to the next available one of a set of temporary storage locations. The processor can then resume a sequence of processing other sets of data in accordance with the logic tests 1 to 7 and the application of the appropriate one of equations 1 to 9 to the selected values or pairs of values A,B, or B,C, or C,D which result from the logic tests 1 to 7, in order to compute the target velocity. As soon as one set of data has been removed from the temporary store that storage location is indicated as free for subsequent use. A running tally would be kept by the computer as to the order in which the temporary locations are to be and have been used and the data could preferably be dealt with on a first-in first-out (FIFO) basis. After computing the velocity, the velocity correction of equation 10 would then be applied to the data before passing it on for storage, display or further processing such as relating it to data obtained during previous range scans.

In this embodiment the sample-and-hold circuits would include analog-to-digital conversion means and such means would have to respond rapidly, preferably taking the form of a flash A-D converter as mentioned hereinbefore. Delay elements 71 can be provided if required at the inputs of the sample-and-hold circuits 123 to allow for the delay in the peak detector 122 and in the combining circuit 125 so that the sample value held as a result of the timing pulse 95 properly represents the peak value of the corresponding signal. Alternatively a peristaltic charge coupled device (CCD) can be employed in the sampling device and the output gated into a hold cicuit including an A-D converter when a sample corresponding to the occurrence of a peak arrives thereat. In all the embodiments the processing speed of the data processor 120 can be increased by providing log and antilog conversion ROMs and progamming the processor so that multiplication and division is carried out by the addition or subtraction of logarithms.

The chirp modulation centre frequency and swing can be modified considerably from that illustrated in the present example provided that a suitable modulator and corresponding chirp pulse compression filter are used. A different number of adjacent output sections can be employed in the pulse compression filter means in order to extend or reduce the range of measurement for a given set of modulation parameters which latter may be determined by considerations other than velocity range, such as the availability or cost of the modulator or compression filter. Thus the range of velocities can readily be extended by employing a chirp modulation having a higher centre frequency fc while using the same percentage modulation frequency swing. The invention can usefully be employed also when using compression filter means with only two adjacent output passbands in which case, of course, no pulse analysis would be required to determine which region of overlap contained the received echo. As mentioned before, each output passband of the compression filter would preferably be made the same as the modulation frequency swing of the chirp modulation unless it is desired to provide solely an indication of the presence of targets whose velocities lie outside the measurement range.

Although it would be usual to make the central crossover point, i.e. the central frequency boundary between two adjacent passbands, correspond to zero Doppler shift to enable approaching and receding velocities to be correspondingly measured, the crossover frequency may alternatively be displaced relative to the centre frequency fc of the chirp modulation so as to correspond to a predetermined non-zero Doppler shift (line of sight velocity) and, if desired, the entire measurement range can be made to respond only to approaching or only to receding targets.

The invention has been described herein with reference to an optical ranging device employing a $CO_2$ laser, but it is not intended to be limited thereto, and other forms of laser source can be employed. The invention can furthermore be readily used in corresponding radar and ultrasonic chirp echo ranging systems as will be understood by persons skilled in the art.

From reading the present disclosure, other modifications will be apparent to persons skilled in the art. Such modifications may involve other features which are already known in the design, manufacture and use of systems for chirp echo ranging and devices for chirp echo ranging and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A chirp pulse echo ranging apparatus comprising transmitting means for emitting pulses of wave energy, each having a frequency which varied linearly during the pulse duration, receiving means for receiving echo signals resulting from reflection of the emitted wave energy from an object, frequency compression means coupled to the receiving means and having a frequency dispersion characteristic for effecting substantially simultaneous production of components of the received echo signals associated with different predetermined frequencies, thereby forming compressed echo pulses, and timing means for determining a time delay between the occurrence of each compressed echo pulse and a timing reference pulse having a predetermined relationship to a time at which a respective pulse of wave energy was transmitted, characterized in that:
 a. the frequency compression means includes a plurality of outputs at which ones of said components in different frequency bands are produced; and
 b. the apparatus includes processing means coupled to said outputs for determining from relative magnitudes of said components a line of sight velocity of the object relative to the apparatus.

2. An apparatus as in claim 1 where the different frequency bands are contiguous.

3. An apparatus as in claim 1 where each of said frequency bands has a bandwidth which does not exceed the difference between and initial frequency and a final frequency of each emitted pulse.

4. An apparatus as in claim 1 where the frequency compression means comprises a surface acoustic wave frequency compression filter including a piezoelectric substrate supporting:
 a. a first arrangement of electrode strips forming an input interdigital electrode array coupled to the receiving means for launching surface acoustic waves representative of the echo signal along a predetermined propagation direction; and b. a second arrangement of electrode strips forming an output interdigital electrode array for receiving said surface acoustic waves;

the arrays being inclined to the propagation direction and to one another and the electrode strips being disposed at right angles to said propagation direction and correspondingly spaced from one another along each array such that the surface acoustic wave delay varies linearly and monotonically with frequency from one end of the array to another to effect decoding of a received chirp echo signal;

said second arrangement comprising a plurality of electrically independent groups of signal electrodes respectively connected to corresponding independent output connections at which the components in different frequency bands are produced.

5. An apparatus as in claim 1 where the processing means includes data processing means for calculating a correction factor from the determined line of sight velocity and for applying said correction factor to an object range represented by the timing delay determined by the timing means to correct for a doppler shift dependent change in said delay associated with the frequency compression means.

6. An apparatus as in claim 1 including:
   a. summation means coupled to the outputs for producing a sum signal representative of the instantaneous sum of the magnitude of signals produced at said outputs;
   b. signal peak detection means coupled to the summation means for producing a timing signal when the sum signal exceeds a predetermined threshold changes from a magnitude which is increasing with time to a magnitude which is decreasing with time; and
   c. measurement means coupled to the outputs of the frequency compression means for sampling and measuring signals produced at said outputs in response to the timing signal.

7. An apparatus as in claim 6 where the measurement means comprises a plurality of analog to digital converters electrically connected to respective ones of the outputs of the frequency compression means.

8. An apparatus as in claim 6, including:
   a. a plurality of logarithmic amplifiers coupled to respective ones of the outputs of the frequency compression means; and
   b. a plurality of analog subtraction devices each having a pair of inputs coupled to respective outputs of two of said logarithmic amplifiers which receive echo signal components in adjacent frequency bands and having an output coupled to respective inputs of the measurement means.

9. An apparatus as in claim 8 where the measurement means comprises antilog circuit means for producing analog signals and analog to digital conversion means for converting said analog signals to digital signals.

10. An apparatus as in claim 8 where the measurement means comprises antilog analog to digital conversion means.

11. An apparatus as in claim 9 where the analog to digital conversion means comprises a flash analog to digital converter.

12. An apparatus as in claim 11 where the processing means comprises:
   a. a plurality of peak signal detectors each having an input coupled to a respective output of the frequency compression means;
   b. a plurality of sample and hold circuits each having an input coupled to an output of a respective one of the peak signal detectors; and
   c. a combining means having a plurality of inputs coupled to the outputs of respective ones of the peak signal detectors and having an output coupled to hold inputs of the sample and hold circuits, said combining means producing a timing signal at said output upon the occurrence of an output signal from at least one of the peak signal detectors.

13. An apparatus as in claim 12 where each sample and hold circuit includes a digital to analog converter.

14. An apparatus as in claim 13 where the digital to analog converter comprises a flash digital to analog converter.

15. An apparatus as in claim 12 where each sample and hold circuit includes a peristaltic charge coupled device.

16. An apparatus as in claim 1 where the frequency compression means includes more than two of said outputs at which components in different frequency bands are produced and where the processing means includes an arrangement of comparators and logic circuits forming a signal amplitude analyzing arrangement for sensing the relative amplitudes of said components and for producing a signal indicating a pair of said outputs at which overlapping ones of said frequency bands occur.

17. An apparatus as in claim 1 where the wave energy comprises electromagnetic wave energy.

18. An apparatus as in claim 17 where the electromagnetic wave energy is in the infrared frequency band.

19. An apparatus as in claim 1 where the wave energy comprises ultrasound wave energy.

20. An apparatus as in claim 1 where the frequency compression means comprises a surface acoustic wave frequency compression filter including a piezoelectric substrate supporting:
   a. a first arrangement of electrode strips forming an input interdigital electrode array coupled to the receiving means for launching surface acoustic waves representative of the echo signals along a predetermined propagation direction; and
   b. a second arrangement of electrode strips forming an output interdigital electrode array for receiving said surface acoustic waves;
   the arrays being inclined to the propagation direction and to one another and the electrode strips being disposed at right angles to said propagation direction and correspondingly spaced from one another along each array such that the surface acoustic wave delay varies linearly and monotonically with frequency from one end of the array to another to effect decoding of a received chirp echo signal;
   said second arrangement comprising a plurality of electrically independent groups of signal electrodes respectively connected to corresponding independent output connections at which the components in different frequency bands are produced, said frequency bands being contiguous.

21. An apparatus as in claim 20 where the electrically independent groups of signal electrodes are electrically connected to a common bus bar.

22. A method of chirp pulse echo ranging comprising the steps of emitting pulses of wave energy, each having a frequency which varies linearly during the pulse duration, receiving echo signals resulting from reflection of the emitted wave energy from an object, dispersively frequency compressing the echo signals to form compressed echo pulses, and measuring a time delay between the occurrence of each compressed echo pulse and a timing reference pulse having a predetermined relationship to a time at which a respective pulse of wave energy was transmitted, characterized in that:
  a. the frequency compressing effects substantially simultaneous production of components of the received echo signals which are associated with different predetermined frequency bands; and
  b. a line of sight velocity of the object is determined from relative amplitudes of said components.

23. A method as in claim 22 where the frequency bands are contiguous.

24. A method as in claim 22 where the frequency compression effects the production of more than two of the components such that adjacent pairs of the frequency bands represent respective ranges of line of sight velocities of the object, and where the amplitude of said components are sensed to detect and identify a pair of adjacent frequency bands for which said components have at least a predetermined amplitude.

25. A method as in claim 22 where the width of the frequency bands is no larger than the magnitude of the frequency variation of the emitted pulses.

26. A method as in claim 22 where the wave energy comprises electromagnetic wave energy.

27. A method as in claim 26 where the electromagnetic wave energy is in the infrared frequency band.

28. A method as in claim 22 where the wave energy comprises ultrasound wave energy.

* * * * *